Figure 2:
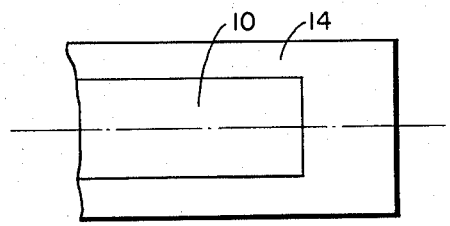

Nov. 23, 1965    L. R. ALLEN ETAL    3,218,693
PROCESS OF MAKING NIOBIUM STANNIDE SUPERCONDUCTORS
Filed July 3, 1962

INVENTORS
LLOYD R. ALLEN
ROBERT A. STAUFFER
DILIP K. DAS

United States Patent Office 3,218,693
Patented Nov. 23, 1965

3,218,693
PROCESS OF MAKING NIOBIUM STANNIDE SUPERCONDUCTORS
Lloyd R. Allen, Belmont, Dilip K. Das, Bedford, and Robert A. Stauffer, Weston, Mass., assignors to National Research Corporation, Cambridge, Mass., a corporation of Massachusetts
Filed July 3, 1962, Ser. No. 207,320
15 Claims. (Cl. 29—155.5)

This application is a continuation-in-part of our copending application Serial No. 193,281, filed May 8, 1962.

The present invention relates to superconductive materials and more particularly to the fabrication of members employing the superconducting compound, $Nb_3Sn$. This compound has high magnetic field tolerance, under certain conditions, and can handle high current densities. However, it is very brittle and this limitation prevents its fabrication into electric circuit components.

It is therefore an object of the instant invention to provide a superconductive $Nb_3Sn$ member which will have sufficient ductility to permit working and a method of making such a member.

It is a further object of the invention to provide a method of fabricating such a member in a manner to assure that uniform thin films of $Nb_3Sn$ will be formed.

The invention is carried into effect by providing alternating layers of niobium and tin to form a composite structure. The composite structure is cold worked, as by rolling, swaging or drawing, to produce a substantial reduction in thickness of the composite structure. The cold working is enhanced by the high ductility of the tin which acts as a lubricant between the layers of niobium. The composite structure is then heated to produce $Nb_3Sn$ diffusion layers at these interfaces. The $Nb_3Sn$ layers are very thin compared to the remaining niobium layers. The heating for diffusion and reaction also serves to anneal the unreacted niobium. The composite structure thus provides a ductile, superconducting element using $Nb_3Sn$ which is capable of being further fabricated. The multiplication of thin $Nb_3Sn$ layers provides a high current carrying capacity at high magnetic fields. The larger initial dimensions of the layers afford ease of assembly and the reduced final dimensions are suitable for small electrical components. The longitudinal stretching during cold work produces clean interfaces of niobium and tin, by dispersing contaminants and forming new interface surface without exposure to atmosphere or other contaminants. This improves the wetting of the niobium by tin leading to greater uniformity of the resulting $Nb_3Sn$ layers, after heating.

The invention accordingly comprises the superconductive article of manufacture possessing the construction, combination of elements and arrangement of parts and the method of making said article comprising the steps and relation thereof to one another, both of which are exemplified in the following detailed disclosure, and the scope of the application of which will be indicated in the claims.

Figure 5:
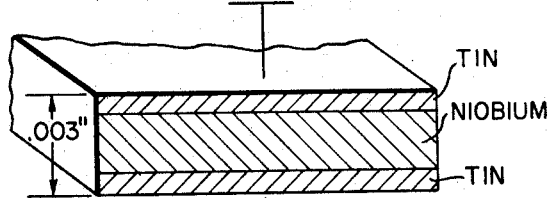
Figure 5:
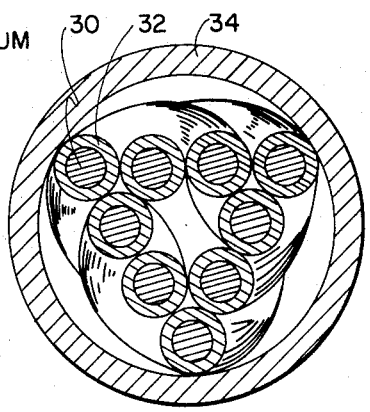
Figure 1:
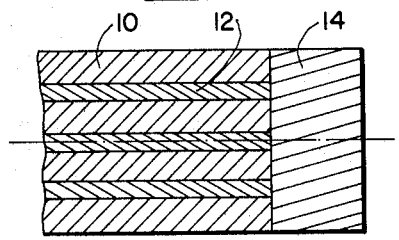
Figure 3:
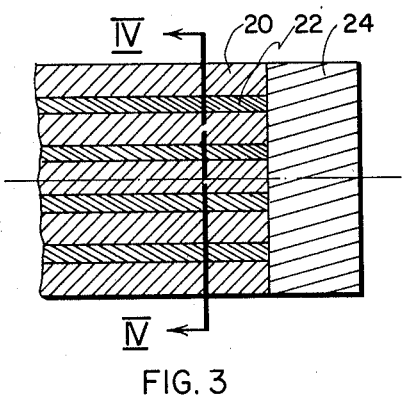
Figure 4:
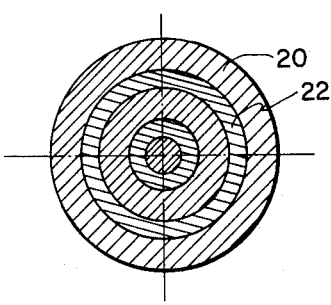

For a fuller understanding of the nature and objects of the invention, reference should be had to the following detailed description taken in connection with the accompanying drawings, wherein:

FIG. 1 is a sectional view of a first preferred embodiment of the invention;
FIG. 2 is a top view of the FIG. 1 embodiment;
FIG. 3 is a sectional view of a second preferred embodiment;
FIG. 4 is a cross-section taken along the line IV—IV in FIG. 3;
FIG. 5 is a sectional view of a third preferred embodiment; and
FIG. 6 is a block diagram of the process of the invention indicating a composite foil in section prior to heat treatment.

In the preferred embodiment of the invention shown in FIG. 1 alternating layers of niobium sheet 10 and tin sheet 12 are interleaved. The interleaved sheets are fitted with a "picture frame" 14, as shown in FIGS. 1 and 2. While four niobium sheets and three tin sheets are shown in this example, for illustration, a larger number of sheets, e.g. 40 niobium and 39 tin sheets would be used in practice. The composite thickness is reduced in a rolling mill by being cold rolled through several passes, each pass reducing the thickness by a factor of 5–6% until the thickness is halved. The picture frame is trimmed off and the rolled composite is placed in a vacuum furnace and heated to a temperature between 800° C. and 1100° C. at a pressure of about 10 microns Hg abs. It is held at this temperature for up to several hours to cause the tin to diffuse into the niobium and promote reaction between the niobium and tin to form $Nb_3Sn$. Additionally, this heating serves to partially anneal the niobium thus restoring some of the ductility lost in cold working. In a variation of this embodiment, the alternating elements may be arranged as concentric cylinders with the cold work applied by swaging.

This embodiment is practiced with a high ratio of niobium to tin to improve ductility and with great reductions in area to improve the wetting of the niobium by the tin as shown in the following illustrative examples:

*Example 1*

A composite foil was made by cladding a one-inch wide 55 mil (.055″) thick piece of niobium foil on both sides with tin in a Sn:Nb:Sn ratio of 1:10:1 for a total of 62 mils (.062″). The composite was reduced during cladding to a thickness of 3 mils (.003″) through cold work reductions. The composite was then heated in an argon atmosphere, maintained in a glass wall argon furnace, by passing a current through it. The sample was observed microscopically (60× magnification) during the heat treatment and it was observed that approximately one-third of the niobium surface was wet by the tin in discontinuous patches whereas in the remaining areas the tin tended to ball up on heating.

It appears that increasing the wetting of the niobium surface by tin is the way to insure a uniform layer of tin will remain on the niobium surface during the heat treatment and that a uniform layer of $Nb_3Sn$ will be formed subsequently. The reduction of thickness in the above example was limited to 20:1 by the work hardening of the niobium.

*Example 2*

A series of one inch wide, 55 mil (.055″) thick, sheets of niobium were vacuum annealed at 1200° C. for an hour. They were softened to a hardness of 25 on a Rockwell "A" scale. These samples, in 7″ long strips, were sandwiched with tin in Sn:Nb:Sn ratios of 1:10:1 to produce composites of 62 mils (.062″) thick, as in the previous example. The samples were cold rolled down to composite thickness 2.2 mil (.0022″), approximately a 28:1 reduction. The sample was heated in argon as in Example 1. It was observed that the wetting of niobium by the tin appeared to be substantially complete.

*Example 3*

Several test samples were treated as in Example 2. They were heat treated in the argon furnace to produce the thin diffusion layers of $Nb_3Sn$ at the two niobium tin interfaces. Since the heating was caused by passing current through the sample, the sample temperature could not be checked with thermocouples. The temperatures were checked by optical pyrometry and are indicated in the table below. Subsidiary testing had established that the samples undergo substantial changes in resistivity in the course of heating. The estimated actual temperatures are indicated in parenthesis next to the observed temperatures in the table. The time of heating for each run is listed. Resultant critical current per mil (.001″) width of interface is shown. The samples were tested for critical current in 59 mil (.059″) width cuttings placed in an external field of 13 kilogauss at liquid helium temperature. The calculation for the listed critical current is amperes divided by 2 times 59 mil width, or 118 mil width.

| Run | Temperature (° C.) | Time (Minutes) | Critical Current, amps/mil width interface |
|---|---|---|---|
| 1 | 850 (1,050) | 60 | .026 |
| 2 | 900 (1,100) | 60 | .023 |
| 3 | 900 (1,100) | 5 | .160 |
| 4 | 900 (1,100) | 5 | .093 |

A fifth run was made by heating one of the samples in a vacuum furnace with external heaters so that the temperature could be measured with a thermocouple. The sample was heated at 970° C. for 60 minutes. It was tested for critical current as in the previous runs and showed a critical current of .195 amp per mil width of niobium tin interface, i.e. per mil width of $Nb_3Sn$ layer.

The results of runs 1 and 2 are very low. The results of runs 3–5 establish good values of critical current. The time and temperature relation can be further optimized to get even higher values of critical current.

The variation of results in accord with time and temperature reflects the following factors. The locus of time and temperature combinations to produce a constant critical current in the resultant sample in an exponential function. Thus, the control of diffusion of tin into the niobium, which in turn controls the resultant $Nb_3Sn$ layer, is very sensitive.

The complete wetting of the niobium surface by the tin as a result of the substantial cold work speeds up the beginning of diffusion and makes it possible to establish reproducible diffusion results. It is possible to react and diffuse the niobium and tin without wetting. However, longer times of heating are required and greater difficulty is encountered in attaining reproducible results. It follows from the results obtained above with cold work that cleanliness of the niobium and tin members to be laminated is important in standardizing the heat treatment process. If the niobium and tin surfaces were initially clean, the substantial cold work would not be necessary. However, since adequate cleanliness is not practically attainable, cold work is necessary to disperse contaminants.

It is preferred to reduce the thickness of the metal stock (assembled niobium and tin) by factors of 50:1 and greater to ensure complete wetting (upon subsequent heating to melt tin). However, substantially complete wetting can be achieved with lesser reductions as demonstrated in Example 3 above. For some purposes, less than complete wetting may suffice so long as the patches of wetted surface are linked to form continuous longitudinal paths through the member as demonstrated in the copending application of Allen, Rupp and Stauffer, S.N. 188,177, filed April 17, 1962. The final form of the cold worked metal stock can be observed microscopically to see if it meets the above criteria.

In a second preferred embodiment of the invention shown in FIGS. 3 and 4, a composite rod formed of alternating layers of niobium 20 and tin 22 is formed. A niobium rod, two niobium cylinders and two tin cylinders are used. A cap 24 is secured on the end of the composite wire. The rod is drawn through dies in several passes, thereby reducing the diameter in excess of 50:1.

The resultant wire is heated in the same manner as the sheet of FIGS. 1–2 to produce a ductile, superconductive wire. Generally, many more alternating layers will be used as indicated above with respect to FIGS. 1–2.

In a third preferred embodiment shown in FIG. 5, nine wires 30 are tightly braided. Three braids of three are, in turn, braided. Each wire consists of a niobium core 30 with a thin (less than .003 inch thick) coating 32 of tin. The coating may be achieved by electroplating or other conventional coating methods. The ductility of the niobium permits braiding. In order to increase the contact area between niobium and tin some uncoated niobium wires may be included in the braid. The tight braid is enclosed by a niobium cylinder 34 and capped. The cylinder is drawn through dies in several passes, each reducing its diameter 5–6% until a substantial reduction in diameter, in excess of 95% is achieved. The cylinder is then heated as in the previous embodiments. While the use of the outer cylinder is preferred, the braid may be used without it. The outer cylinder prevents tin from being squeezed out of the composite and affords more niobium-tin contact area.

Numerous modifications of the above embodiments may be practiced without departing from the spirit of the invention. For example, the niobium elements could be niobium coated materials such as stainless steel with a niobium jacket. It is only necessary that there be sufficient niobium left after the niobium-tin reaction to provide ductility. The amount of thickness reduction can be varied so long as tight packing of the layers and the resultant formation of clean new surface is achieved. It is advisable to coat the superconductive article with outer coats of copper and non-metallic insulation after heat treating, as set forth in the copending application of Allen, Rupp and Stauffer, S.N. 188,177, filed April 17, 1962.

In all of the above embodiments an additional layer of tin may be coated on the outside niobium surface to lubricate it during cold work. The invention may be practiced with a single coating of tin on a niobium wire if care is taken to avoid stripping the tin during cold work and wire drawing dies with long approach paths are used. The invention may be practiced with the application of liquid tin. That is, the niobium in the form of rods or wire may be passed through cold working dies leading into a molten tin bath. The clean niobium surface produced by drawing would be immediately exposed to tin which would wet it.

Since certain changes may be made in the above product and process without departing from the scope of the invention herein involved, it is intended that all matter contained in the above description, or shown in the accompanying drawing, shall be interpreted as illustrative and not in a limiting sense.

What is claimed is:
1. A method of preparing thin superconducting layers of $Nb_3Sn$ comprising the steps of braiding niobium wires, at least some of said wires being coated with a thin film of tin, tightly enclosing said braid in a ductile cylinder, cold working said cylinder to reduce its diameter substantially and subsequently heating said cylinder to diffuse and react the tin and niobium at their interfaces to thereby produce several thin diffusion layers of $Nb_3Sn$.

2. An improved method of making an elongated superconductor member containing the superconductive compound, niobium stannide, in the form of at least one thin layer running continuously through the usable length of the member and which is bendable into desired shapes without substantially impairing the superconductivity of the stannide, the method consisting essentially of the steps of cold working adjacent layers of niobium and tin to clad the layers together and extend their interface, and subsequently heating the layers to produce a thin diffusion layer of niobium stannide at the interface, the heating being terminated short of equilibrium to produce a final member having inhomogeneous structure across the member's cross-section with a layer of niobium adjacent to and supporting the diffusion layer of niobium stannide.

3. The method of claim 2 wherein the laminated material forms concentric cylinders of niobium and tin, the forces being applied by wire drawing.

4. An improved method of making a product consisting essentially of a niobium foil having a superconductive layer of niobium stannide diffused into a surface layer thereof, the superconductive layer being continuous throughout the length of the foil, the method comprising the steps of cold rolling laminated niobium and tin sheets to reduce their composite cross section thickness and extend their interface whereby interface contaminants are dispersed and then heating the composite foil to form the resultant product, terminating the heat treatment short of equilibrium to produce a final foil product having inhomogeneous structure along the thickness dimension of the foil with a niobium substrate layer supporting a surface diffusion layer of niobium stannide.

5. The method of claim 4 wherein the cold work reduces the thickness of the sheets by a ratio in excess of 20:1; and wherein the heating is carried out at about 970° C. for about one hour.

6. The method of claim 4 wherein the sheets are in the form of narrow width ribbons to form a resultant product which is a niobium ribbon having a surface diffusion layer of niobium stannide.

7. The method of claim 4 wherein two tin sheets are applied on opposite faces of the niobium sheet so that the final foil product has diffusion layers of stannide on both faces of the foil with an intermediate supporting layer of niobium.

8. An improved method of making elongated superconductor foil for bending into desired shape and containing a continuous thin band of niobium stannide throughout the length of the foil, the method consisting essentially of the steps of:
  (a) producing a composite of niobium and tin sheet layers surface bonded to each other, the total niobium cross-section thickness being substantially greater than the total tin cross-section thickness,
  (b) cold rolling the composite to reduce its cross section thickness and disperse contaminants at the niobium-tin interface to make the niobium surface substantially fully wettable by molten tin,
  (c) heating the composite to melt the tin and react the molten tin with the niobium to produce a surface diffusion layer of niobium stannide bonded to an adjacent carrier layer of niobium.

9. The method of claim 8 wherein the step (a) of producing the composite is carried out by cold cladding and wherein the steps (a) and (b) are carried out in an essentially continuous sequence of rolling passes.

10. The method of claim 9 wherein the combined thickness of the niobium and tin is reduced in steps (a) and (b) by at least 95%.

11. The method of claim 10 comprising the step of annealing the niobium prior to the step of forming a niobium-tin composite.

12. The method of claim 8 wherein said cold work compression reduces the cross section thickness of said laminated material by at least 95%.

13. The method of claim 12 wherein said cold work compression reduces the thickness of said laminated material by at least 98%.

14. An improved method of making elongated superconductor foil for bending into desired shape and containing a continuous thin bond of a superconductive intermetallic compound of the beta Wolfram structure which runs the length of the foil, the method consisting essentially of the steps of:
  (a) producing a composite of sheet layers of the component metals of the compound by cold roll cladding the layers together,
  (b) continuing the rolling to reduce the composite to foil size and disperse contaminants at the interface between bonded sheets, and
  (c) heat treating the foil composite to form the intermetallic compound as a thin diffusion layer at the interface, terminating the heat treatment short of equilibrium to produce a final foil product having an inhomogeneous structure along the thickness dimension of the foil with a substrate layer of one of the component metals of the compound supporting an adjacent diffusion layer of the intermetallic compound.

15. An improved method of preparing a superconductive wire consisting essentially the steps of coating a plurality of niobium wires with tin, packing the wires into a niobium tube, cold working the tube down to wire size and heat treating the composite wire thus formed to diffuse and react the tin and niobium at their interfaces to thereby produce several thin diffusion layers of superconductive niobium stannide running continuously the length of the wire.

References Cited by the Examiner

UNITED STATES PATENTS

| | | | |
|---|---|---|---|
| 2,286,759 | 6/1942 | Patnode | 29—528 |
| 2,686,355 | 8/1954 | Lundin | 29—189 |
| 2,824,359 | 2/1958 | Rhodes | 29—194 |
| 2,854,737 | 10/1958 | Gray | 29—194 |
| 2,982,017 | 5/1961 | Drummond | 29—470 |
| 2,993,269 | 7/1961 | Kelley | 29—424 |
| 3,090,116 | 5/1963 | Burgess | 29—470.1 |

OTHER REFERENCES

Superconductivity, M. Von Laue, Academic Press, 1952.

State of the Art Surveys of Superconductivity and Superconducting Electromagnets, R. A. Wolf, ASD TN 61–160, available from ASTIA, 276,979.

Superconductivity of $Nb_3Sn$, by B. T. Mathias et al., Physical Review 95, 1435 (1954).

Some New Intermetallic Compounds with B-Wolfran Structure, by S. Geller et al., J. Am. Chem. Soc. 77, 1502–1504 (1955).

Electrical and Magnetic Behavior of $Nb_3Sn$ in Transition Range to Superconductivity, by W. Wiedemann, Z. Physik, 151, 307–27 (1958).

B-Tungsten Structure of Compounds Between Transition Elements and Aluminum, Gallins and Antimony, by Wood et al., Acta Crystallographica 11, 604–6 (1958).

JOHN F. CAMPBELL, *Primary Examiner.*

HYLAND BIZOT, *Examiner.*